United States Patent [19]
Lee

[11] Patent Number: 5,227,616
[45] Date of Patent: Jul. 13, 1993

[54] BARCODE INFORMATION RECOGNIZING AND PROCESSING METHOD

[75] Inventor: Ki H. Lee, Seoul, Rep. of Korea

[73] Assignee: Goldstar Co., Ltd., Rep. of Korea

[21] Appl. No.: 752,853

[22] Filed: Aug. 30, 1991

[30] Foreign Application Priority Data

Sep. 1, 1990 [KR] Rep. of Korea ............... 13805/1990

[51] Int. Cl.$^5$ ............................................. G06K 7/10
[52] U.S. Cl. .................................. 235/462; 235/463; 235/472
[58] Field of Search .............. 235/462, 463, 385, 472

[56] References Cited

U.S. PATENT DOCUMENTS 4,567,361  1/1986  Rosenthal ..................... 235/462

*Primary Examiner*—Harold Pitts
*Attorney, Agent, or Firm*—Blakely, Sokoloff, Taylor & Zafman

[57] ABSTRACT

A barcode information recognizing and processing method enabling a high speed scanning to be obtained and no error in reading the barcode information to occur.

The method comprises storing to an accumulator by a microprocessor (15) a parity discrimination signal (PRT), count signals of one character (CTa, CTb, CTc), a count signal (CTa+CTb) indicating the total length of one character, and a similar character discrimination signal (VAMB) which are outputted in turn from a FIFO memory 14 of a barcode reader decoding system.

Storing shares (M1)(M2)(M3) obtained by dividing the count signal (CTa+CTc)by the count signals (CTa), (CTb), (CTc), respectively; and transmitting through a transmitting/receiving unit 16 a denary data according to a result obtained by recognizing an original barcode information from said shares (M1), (M2), (M3).

3 Claims, 8 Drawing Sheets

FIG. 6
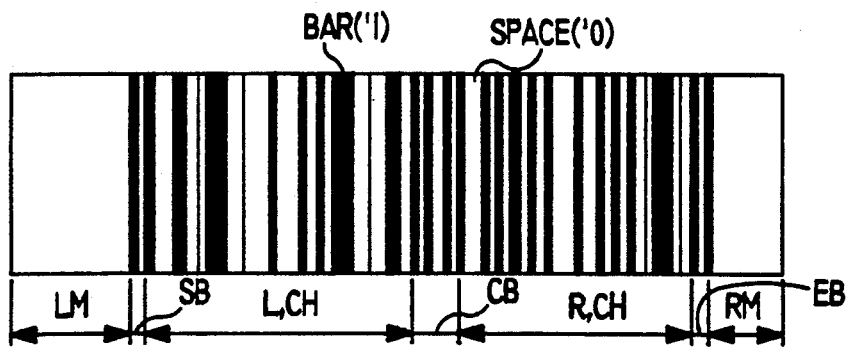
FIG. 7
| ID | L,CH | | | R,CH | | |
|---|---|---|---|---|---|---|
| | CTa | CTb | CTc | CTa | CTb | CTc |
| 0 | 5 | 3 | 2 | 2 | 3 | 5 |
| 1 | 4 | 4 | 3 | 3 | 4 | 4 |
| 2 | 3 | 3 | 4 | 4 | 3 | 3 |
| 3 | 5 | 5 | 2 | 2 | 5 | 5 |
| 4 | 2 | 4 | 5 | 5 | 4 | 2 |
| 5 | 3 | 5 | 4 | 4 | 5 | 3 |
| 6 | 2 | 2 | 5 | 5 | 2 | 2 |
| 7 | 4 | 4 | 3 | 3 | 4 | 4 |
| 8 | 3 | 3 | 4 | 4 | 3 | 3 |
| 9 | 4 | 2 | 3 | 3 | 2 | 4 |
FIG. 8A
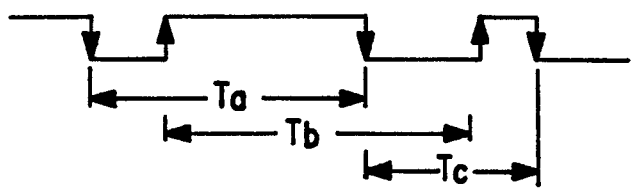
FIG. 8B
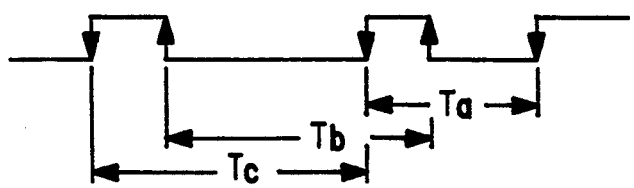

BARCODE INFORMATION RECOGNIZING AND PROCESSING METHOD

BACKGROUND OF THE INVENTION

The present invention relates to a barcode reader, more particularly to a barcode reader decoding system which software-processes barcode-related data received from first-in first-out (FIFO) memory in use of the Delta Distance Method and then correctly transmits the software-processed barcode-related data to a host computer through serial transmission interface.

FIG. 1 shows a block diagram of a conventional barcode reader decoding system comprising:

a slot scanner 1 which converts an optical signal scattered from a barcode to a digital signal, a barcode interval counter controller 2 which counts in binary the number of intervals of the digital signal of the slot scanner 1, a FIFO memory 3 which stores the barcode digital signal of the barcode interval counter controller 2 and also outputs the stored data in synchronization with a clock pulse of pulse generator 4, a decoder 5 which decodes data from the FIFO memory 3, a frame controller 6 which separates normal data of the barcode from data of the decoder 5, a microprocessor 7 which checks and processes data of the barcode from the frame controller 6 and controls the slot scanner 1 through a scan controller 8 in order to determine whether the barcode is on a position to be read by the slot scanner 1, and an interface adapter 9 which interfaces to a host computer 10 to the normal barcode generated from the microprocessor 7.

The operation of a conventional barcode reader decoding system having the above configuration will be described below.

The slot scanner 1 converts to an electrical signal an optical signal scattered from a barcode by means of a control signal of the scan controller 8 which is controlled by the microprocessor 7, generates a digital pulse of a space/bar transition signal $\overline{STV}$ indicating changes from a space to a bar or of a bar/space transition signal $\overline{RTV}$ indicating changes from a bar to a space, and applies the digital pulse to the barcode interval counter controller 2.

At this time, the barcode interval counter controller 2 counts in binary the respective time intervals of the space/bar transition signal $\overline{STV}$ and the bar/space transition signal $\overline{RTV}$ and stores the counting results in the FIFO memory 3.

That is, the barcode interval counter controller 2 is disabled with the signals $\overline{STV}$, $\overline{RTV}$ of the slot scanner 1, time interval count signals of the space/bar transition signal $\overline{STV}$ and the bar/space transition signal $\overline{RTV}$ are applied to the FIFO memory 3 together with a signal VID indicating "1" on a bar and "0" on an interval.

At this time, the barcode interval counter controller 2 is reset and a next bar signal is counted. The data stored in the FIFO memory 3 is outputted to the decoder 5 in synchronization with clock pulse of pulse generator 4 while 11-bit binary data indicating an entire barcode width, signal VID indicating whether an interval is a bar or a space, and clock pulse CLK are applied to the decoder 5.

Hence, the decoder 5 produces a BCD bit indicating a decimal character according to the data from the FIFO memory 3, and a 4-bit BCD code indicating left margin, right margin, center band, error and the like. That is, a mark signal MARK indicating whether a barcode interval means a bar or a space, an equal signal EQUAL indicating if the present barcode interval together with three prior intervals are equal to present interval, and a parity signal PARITY which indicates whether the barcode is an odd parity or an even parity are applied to the frame controller 6.

The frame controller 6 separates proper data or improper data as a barcode from signals of the decoder 5 by means of a read signal RD and a write signal WR outputted from the microprocessor 7 and applies separated data to the microprocessor 7.

The microprocessor 7 adjusts the slot scanner 1 through the scan controller 8 in order to determine whether the barcode is on a position to be read by the slot scanner 1, checks the frame controller 6 when signals of the adjusted slot scanner 1 are applied to the microprocessor 7 through the frame controller 6, performs a correlation analysis and a Module-Ten-Check in order to determine whether the barcode data is proper when the separated barcode data is applied to the microprocessor 7, and transmits a proper barcode to the host computer 10 through an interface adapter 9.

However, since such a prior art barcode-reader decode system directly counts spaces and bars by using a space/bar transition signal $\overline{STV}$ and a bar/space transition signal $\overline{RTV}$ of a slot scanner it has drawbacks in that a poor reliability occurs in reading an ink-spread barcode caused when printing a barcode, circuit structure is inevitably complicated due to an intricate decoder construction, and error occurs in case of scanning barcodes at a high speed.

SUMMARY OF THE INVENTION

It is, therefore, an object of the present invention to provide a barcode information recognizing and processing method which correctly transmits barcode-related data to a host computer via an interface circuit after receiving and processing the barcode-related data by a microcomputer which is detected by means of the Delta Distance Method and stored in a FIFO memory.

The above object of the present invention is accomplished by converting optical signals scattered from a barcode into digital signals, generating toggle signals toggling whenever the digital signals are changed from high potential to low potential and vise versa and toggle signals opposite to the above two kinds of toggle signals, counting each width of the toggle signals, detecting various informations necessary to read barcode data by use of the count signals and storing the informations to a FIFO memory, processing the barcode-related data stored in the FIFO memory by a microprocessor, and transmitting the processed data to a host computer through an interface circuit.

BRIEF DESCRIPTION OF THE DRAWINGS

The above and other objects, features and advantages of the invention will become apparent from the following detailed description taken in conjunction with the accompanying drawings, wherein:

FIG. 6 is a diagram showing the configuration of a barcode for explaining the present invention;

FIG. 7 is a character table according to the Delta Distance Method of the present invention;

FIG. 8A and 8B is a output waveforms of the pulse generator of FIG. 2 according to the Delta Distance Method of the present invention.

DETAILED DESCRIPTION OF THE INVENTION

Figure 1:
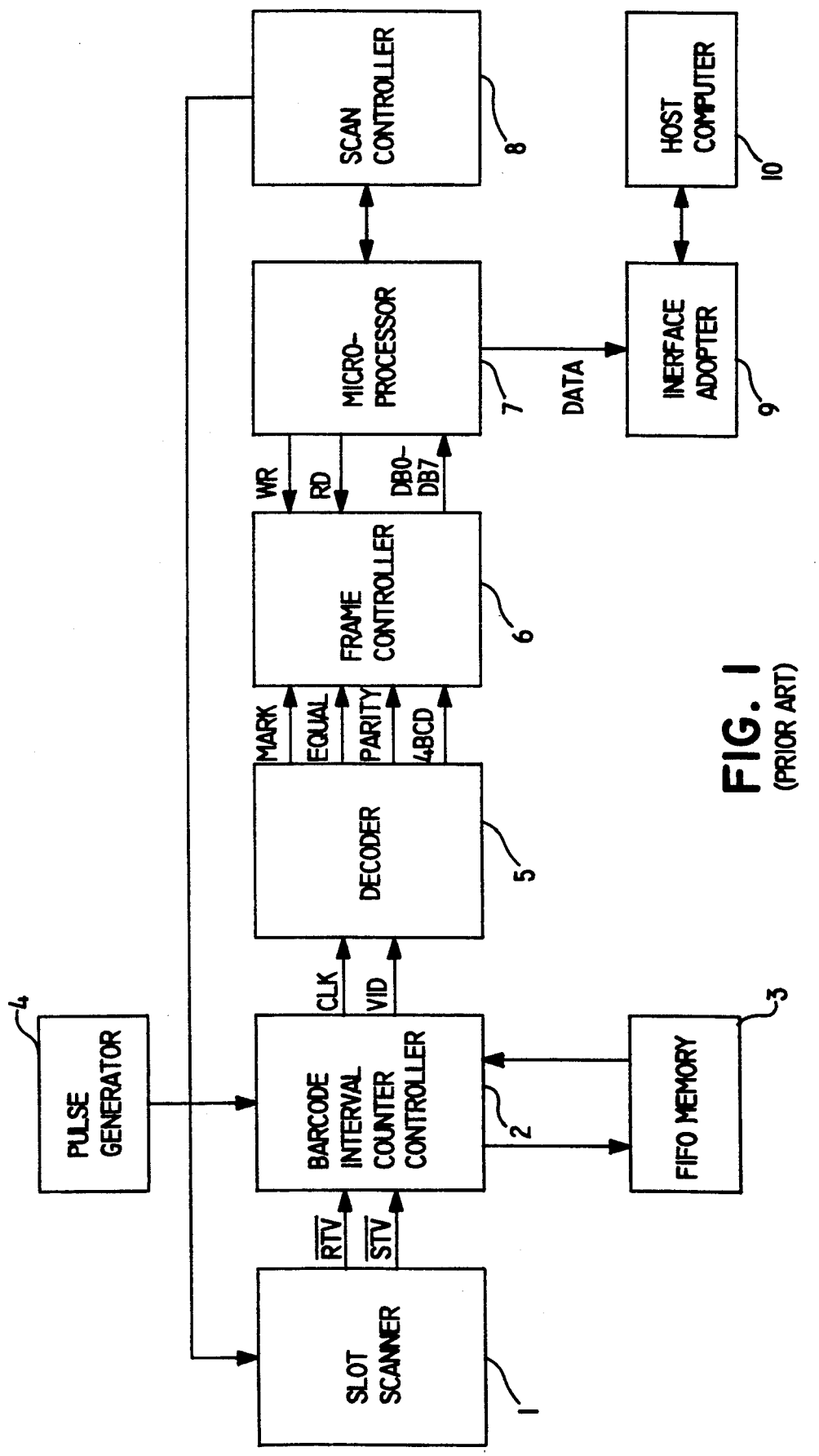
FIG. 1 is a block diagram of a conventional barcode reader decoding system.
Figure 2:
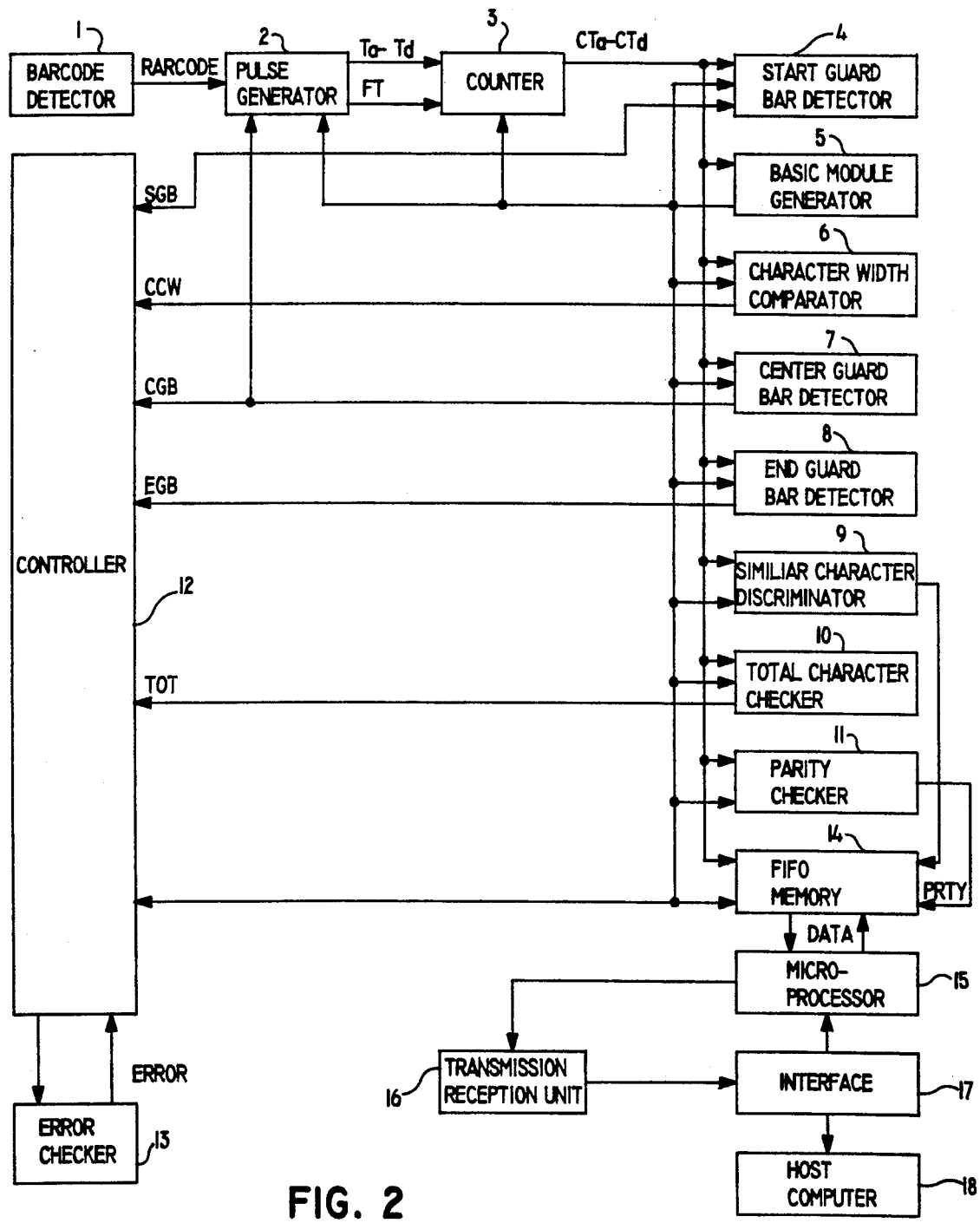
FIG. 2 is a block diagram of a barcode reader decoding system according to the present invention.

FIG. 2 shows a block diagram of a barcode reader decoding system according to the present invention comprising:

a barcode detector 1 for detecting an optical signal scattered from a barcode and converting it to a digital signal, a pulse generator 2 for generating toggle signals Ta, Tb toggling whenever the digital signal changes from HIGH to LOW and vice versa in the barcode detector 1, and toggle signals Tc, Td opposite to the toggle signals Ta, Tb, a counter 3 for counting respective width of the toggle signals Ta-Td of the pulse generator 2 and producing count signals CTa-CTd, a start guard bar detector 4 for detecting a start guard bar which indicates a start signals of a barcode from the count signal of the counter 3 and generating a start guard bar signal SGB, a basic module generator 5 for making a basic module which carries a multiple of the count signal of the counter 3 with respect to one module when the start guard bar signal SGB is detected, a character width comparator 6 for checking whether a character is properly constructed in 7 modules by using the basic module generated from the basic module generator 5 when a signal for one character is inputted from the counter 3, and generating a character width comparing signal CW, a center guard bar detector 7 for checking a center guard bar which is a center signal of a barcode from the count signal of the counter 3, and generating a center guard bar signal CGB, an end guard bar detector 8 for checking an end guard bar which is an end signal of a barcode from the count signal of the counter 3, and generating an end guard bar signal EGB which indicates the end of the barcode, a similar character discriminator 9 for applying to FIFO memory 14 a discrimination signal for making a discrimination between a counter value of a module which a space and a bar adjacent to each other are summed from the counter 3 and a counter value of a module which a bar and a space adjacent to each other are summed from the counter 3, in order to prevent error in a character recognition, a total character checker 10 for checking whether the number of character on the left of a center guard bar from the counter 3 is the same as that of character on the right of the same bar, and generating a total character signal TOT, a parity checker 11 for checking whether, in the characters generated from the counter 3, a barcode is entered from the left of a center guard baror from the right of the same bar, and applying an odd parity or an even parity to the FIFO memory 14, a controller 12 for checking outputs of the start guard bar detector 4 and the character width comparator 6 to store outputs of the parity checker 11, counter 3 and similar character discriminator 9 in the FIFO memory 14, and checking outputs of the end guard bar detector 8 and total character checker 10 to control the output of data of the FIFO memory 14, an error checker 13 for receiving a total character signal TOT outputted from the total character checker 10 through the controller 12 to check error, a microprocessor 14 for receiving a parity signal, count signals CTa-CTc, a total character signal TOT and a similar character discrimination signal VAMB which are outputted from the FIFO memory 14, to process with an original barcode information, and a transmitting/receiving unit 16 and an interface 17 for transmitting output data of the microcomputer 15 to a host computer 18.

Figure 3:
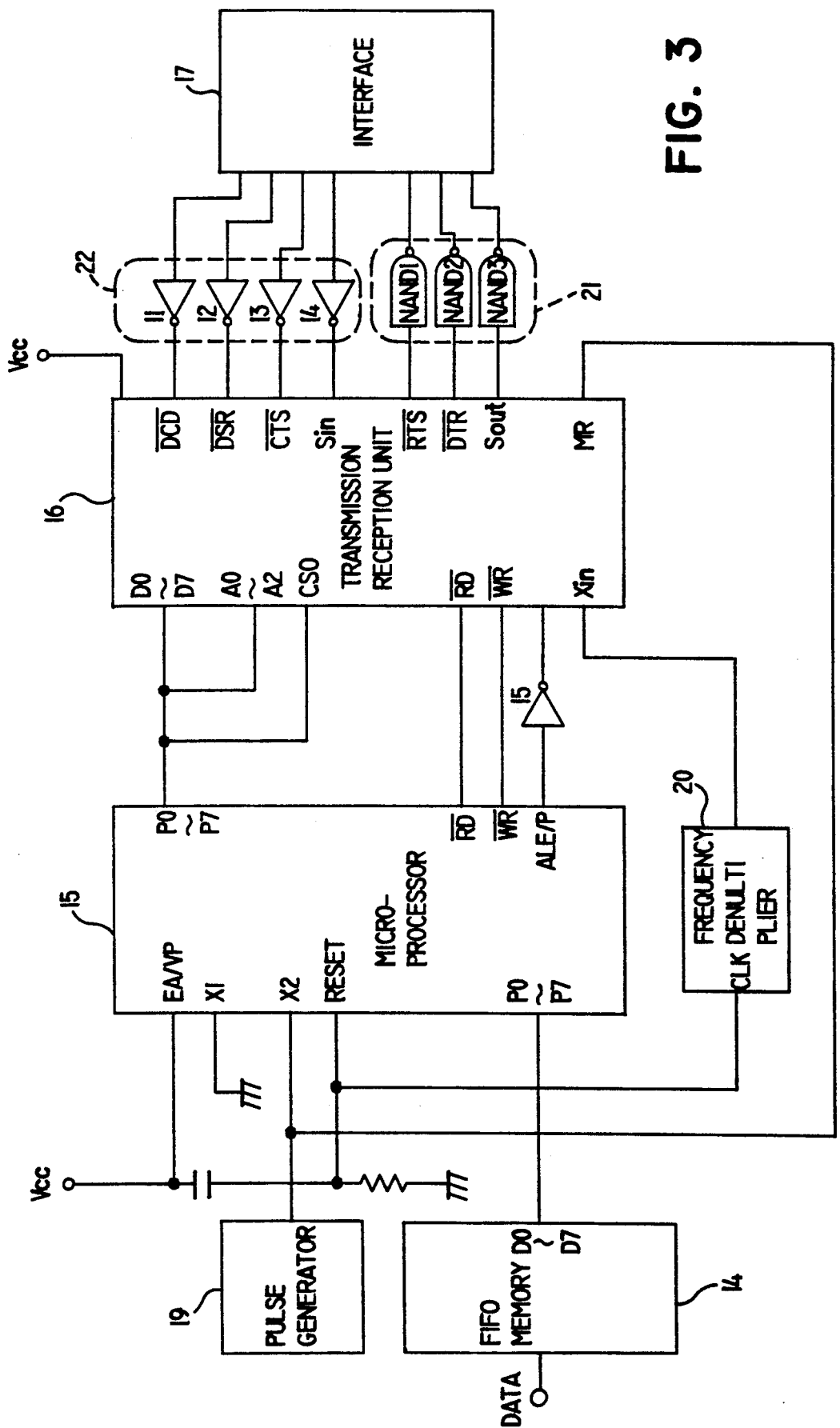
FIG. 3 is a detailed circuit diagram of a microprocessor and a asynchronous type transmitting and receiving unit of FIG. 2.

Referring to FIG. 3 which is a detailed circuit diagram of the microprocessor and the asynchronous transmitting/receiving unit of FIG. 2, the circuit comprises a microprocessor 15 for processing data outputted from the FIFO memory 14 with the original barcode information by synchronizing the data with a clock pulse of the pulse generator 19 and transmitting the processed data, a frequency demultiplier 20 for frequency-demultiplying the clock pulse from the pulse generator 19, a transmitting/receiving unit 16 for transmitting in series the parallel data which is transmitted from the microprocessor 15 by being synchronized with the clock pulse transmitted from the frequency demultiplier 20, a logic circuit 21 consisting of NAND gates NAND1-NAND3 for transmitting to the interface 17 the serial data transmitted from the transmitting/receiving unit 16, and a buffer circuit 22 consisting of inverter gates I1-I4 for transmitting to the transmitting/receiving unit 16 a signal outputted from the host computer 18 and having passed through the interface 17. In the drawing, reference I5 denotes an inverter gate.

Referring to FIG. 6 which is an explanatory view showing the configuration of a barcode used in the present invention, a bar ("1") and a space ("0"), both of which become units in the barcode, are referred to as a module, respectively. As can be seen from the left end of a barcode, there are a left margin LM more than 11 modules, start guard bar SB which indicates barcode start, left characters L, CH constituted with 7 modules, center guard bar CB on the center, right characters R, CH constituted with 7 modules, end guard bar EB indicating the end of the barcode, and a right margin RM of the right barcode more than 7 modules.

And also, one character consists of 2 spaces and 2 bars. On the left of the center guard bar CB, a space, a bar, a space, and a bar appear by turns, on the right of the center guard bar CB, a bar, a space, a bar and a space appear by turns, which makes possible the scanning in both directions.

The start guard bar SB is constituted with modules of 1, 0, 1, the center guard bar CB with those of 0, 1, 0, 1, 0, and the end guard bar EB with those of 1, 0, 1.

The operation and effect of the present invention having such a configuration will be described in detail as follows.

An optical signal scattered from a barcode is detected by the barcode detector 1 and converted into a digital signal and then applied to the pulse generator 2. The pulse generator 2 generates a toggle signal Ta which is toggled whever the barcode signal is changed from a high potential "1" to a low potential "0", and a toggle signal Ta which is opposite to the toggle signal Ta. At the same time, a toggle signal Tb which is toggled whenever the barcode signal is changed from a low potential "0" to a high potential "1", is generated from the pulse generated.

For example, when digital signals, as shown in FIG. 8A, are outputted from the barcode detector 1 by scanning the barcode from the left, the pulse generator 2 outputs toggle signals Ta, Tb and Tc, as shown in FIG. 8A and when digital signals, as shown in FIG. 8B, are outputted from the barcode detector 1 by scanning the barcode from the right, the pulse generator 2 outputs toggle signals Tc, Tb and Ta, as shown in FIG. 8B.

And, whenever the toggle signals Ta, Tb and Tc are changed from high potential to low potential impulse signals FTa–FTc are outputted. The toggle signals Ta, Tb and Tc are applied to the counter 3, and thus the counter 3 counts the width of the count signals CTa–CTc and memories the counted width until the counting of the respective next toggle signals. The memorized count signals CTa–CTc are outputted as a respective 8 bit and applied to the start guard bar detector 4 and the like. At this moment, the start guard bar detector 4 detects a start guard bar SB from the count signals CTa–CTc and applies a start guard bar signal SGB to the controller 12, thereby the controller 12 controls the whole system. When the start guard bar signal SGB is detected by the start guard bar detector 4, the basic module generator 5 multiplies and adds the count signals CTa, CTb and CTc of the counter 3 and constructs basic modules 4 MOD, 6 MOD, 8 MOD and 10 MOD. And, the character width comparator 6 adds count signals CTa and CTc of the counter 3 whenever one character L, CH is read from the count signals CTa–CTc of the counter 3 to find the length of one character and compares the character with the basic modules 6 MOD and 8 MOD outputted from the basic module generator 5 to determine whether the character is a proper one consisting of 7 modules, and when it is determined to be a proper character, applies a character width comparison signal CCW to the controller 12. That is, if the one character obtained by adding the count signals CTa–CTc of the counter 3 carries 7 modules and is positioned between the basic modules 6 MOD and 9 MOD, the character width comparator 7 determines it to be a proper character and outputs a character width comparison signal CW. Hence, the center guard bar detector 7 detects from the count signals CTa–CTc of the counter whether a enter guard bar CB of 0, 1, 0, 1, 0 is entered. At this moment, when the center guard bar CB is detected, the center guard bar detector 7 outputs a center guard bar signal CGB to the controller 12 and to the pulse generator 2 and then the pulse generator 2 inverts the barcode signal in order for left and right character structures of a center guard bar in inverse to each other to have the same structures to each other. By doing so, it is possible to construct a more efficient circuit configuration.

Thereafter, when a series of characters are finished, the end guard bar detector 8 checks whether an end bar EB of 1, 0, 1 is inputted from the counter 3 and outputs an end guard bar signal EGB indicating the end of the barcode when the end guard bar EB is detected.

FIG. 4A to FIG. 4J are waveforms of the pulse generator 2 according to the waveforms of the barcode detector 1 when scanning the barcode from the left. As shown in the drawings, as the barcode caries numerals 0–9 in denary, count signals CTa–CTc of the counter 3 are outputted as shown in FIG. 4A to FIG. 4J.

Figure 4:
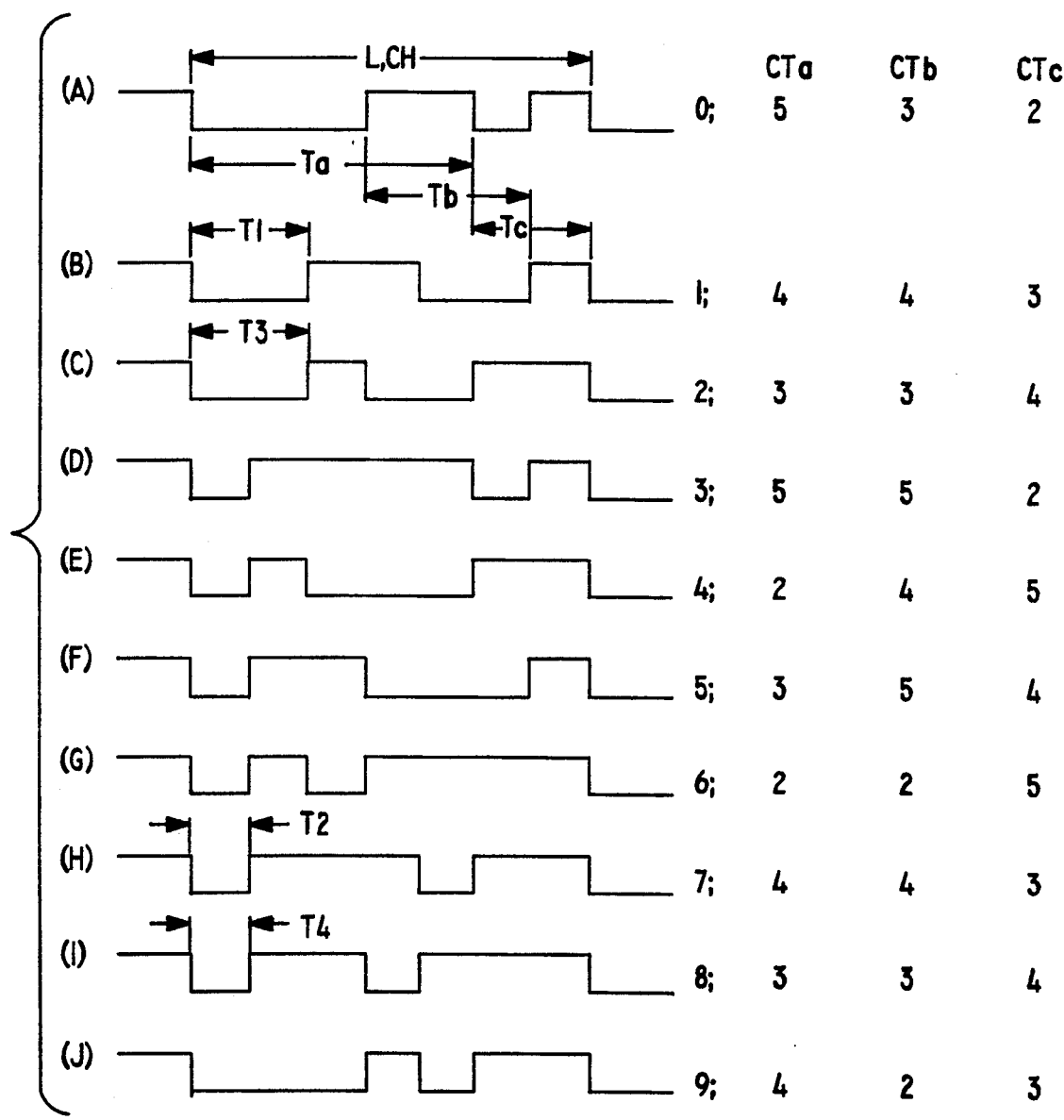
FIG. 4A to FIG. 4J are output waveforms of a pulse generator of FIG. 2 when scanning from the left.
Figure 5:
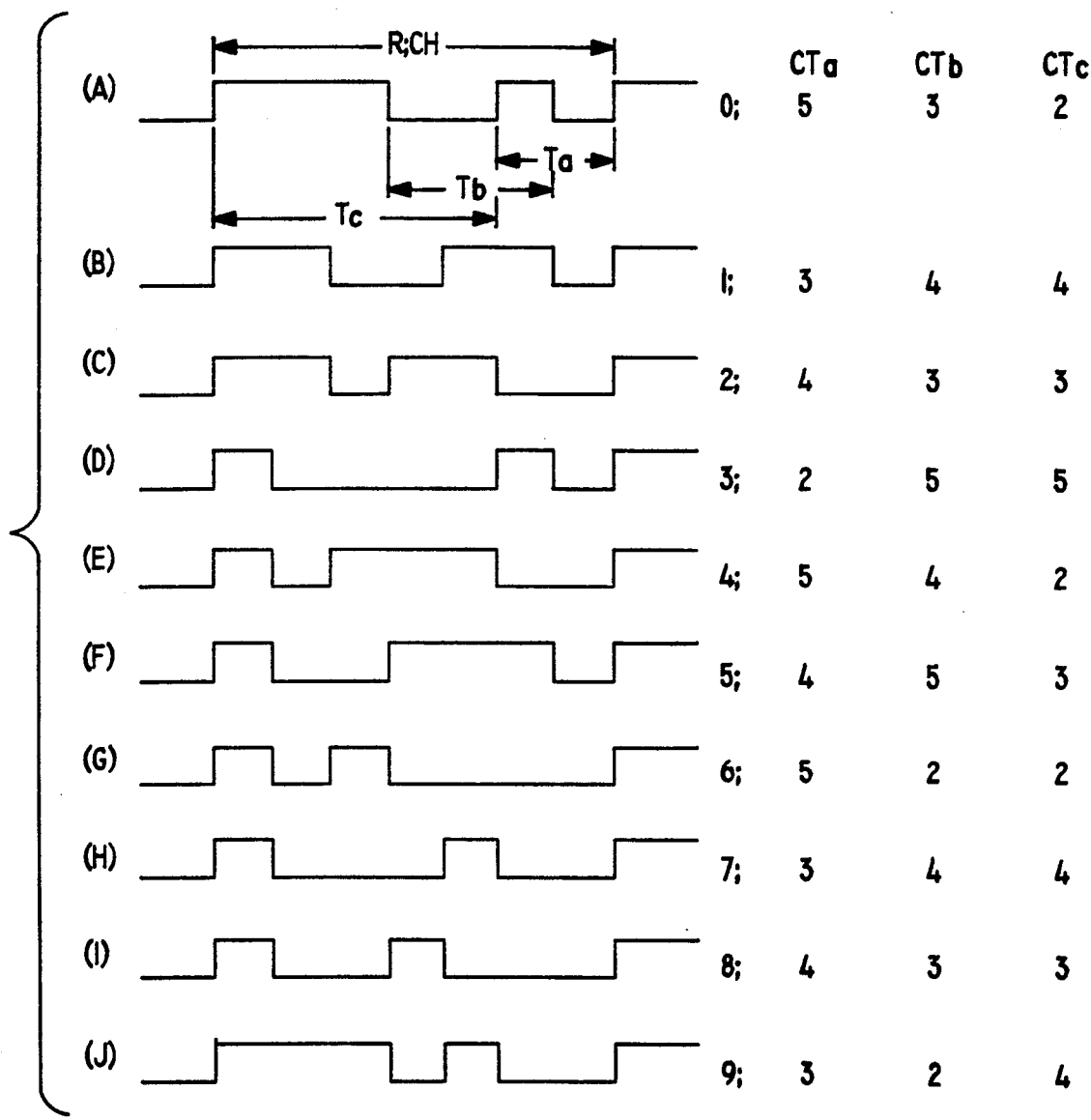
FIG. 5A to FIG. 5J are output waveforms of a pulse generator of FIG. 2 when scanning from the right.

FIG. 5A to FIG. 5J are waveforms of the pulse generator 2 according to the waveforms of the barcode detector 1 when scanning the barcode from the right. As shown in the drawings, as the barcode carries numerals 0–9 in denary, count signals CTa–CTc of the counter 3 are outputted as shown in FIG. 5A to FIG. 5J. The count signals CTa–CTc of FIGS. 4 and 5 are shown in the table of FIG. 7.

As can be seen from FIG. 4B and FIG. 4H, count signals CTa, CTb and CTc for numerals "1" and "7" in denary are 4, 4, 3 both of which are identical to each other, and count signals CTa, CTb and CTc for numeral "2" and "8" are 3, 3, 4 as can be seen from FIG. 4C and FIG. 4I, both of which are identical to each other, thereby the similar character discriminator 9 discriminates similar characters of "1" and "7", "2" and "8" and applies a similarity discrimination signal VAMB to the FIFO memory 14.

That is, character "1" carries two modules (0, 0) in the region T1 as shown in FIG. 4B, and character "7" carries one module (0) in the region T2 as shown in FIG. 4H. Similarly, as for characters "2" and "8", character "2" carries two modules (0, 0) in the region T3 and character "8" carries one module (0) in the region T4, as shown in FIGS. 4C and 4I.

Thus, the one module in the regions T2 and T4 is multiplied to two modules by a multiplier composed in the similar character discriminator 9, and the two modules in the regions T1 and T3 are multiplied to four modules. In addition, the basic module 6 MOD outputted from the basic module generator 5 is demultiplied by ½ by an internal demultiplier of the similar character discriminator 9 and then the 2 module or the 4 module is compared with a 3 module from the demultiplier. In case that the 2-module value or the 4-module value is greater than the 3-module value, it is discriminated to be "1" or "2" at the characters "1" and "7", "2" and "8", but when the 2-module value or the 4-module value is smaller than the 3-module value, it is discriminated to be character "7" or "8". That is, the similar character discriminator 9 outputs a similar character discrimination signal VAMB in high potential to the FIFO memory 14 when the 2-module value or the 4-module value is greater than the 3-module value, while it output a low potential signal to the FIFO memory 14 when the 2-module or 4-module value is smaller than the 3-module value.

Meanwhile, the total character checker 10 increases the counter value every time that one character is ended from the count signals CTa–CTc of the counter 3, to check whether a character of the same number located at both sides of the center guard bar (0, 1, 0, 1, 0) is detected by the counter 3, and applies the results to the error checker 13 through the controller, if it does not same, 12 so that the error checker 13 produces an error signal.

The parity checker 11 discriminates whether the barcode is inputted either from the left or the right of the center guard bar (0, 1, 0, 1, 0) and applies the results to the FIFO memory 14.

That is, the parity checker 11 adds the count signals CTa, CTb and CTc and compares the added count signals CTa+CTb+CTc with basic module 4 MOD, 6 MOD, 8 MOD and 10 MOD which are outputted from the basic module generator 5. If the added signal CTa+CTb+CTc is identical to any one of the basic modules 4 MOD, 6 MOD, 8 MOD, and 10 MOD, the parity checker 1 outputs an even parity discrimination signal PRT to the FIFO memory 14 which indicates that the barcode has been read from the left, while if not, it outputs an odd parity discrimination signal PRT which indicates that the barcode has been read from the right.

The controller 12 controls the whole system upon receipt of a start guard bar signal SGB from the start guard bar detector 4 and also when the character width comparison signal CCW from the character width comparator 6 is recognized to the a proper character, the controller 12 so controls that the parity discrimination signal PRT, count signals CTa-CTc constituting a character, count signals CTa+CTc of the character width comparator 6 indicating the total length of one character, and the similar character discrimination signal VAMB for discrimination a similar character are inputted to the FIFO memory 14.

Figure 9A:
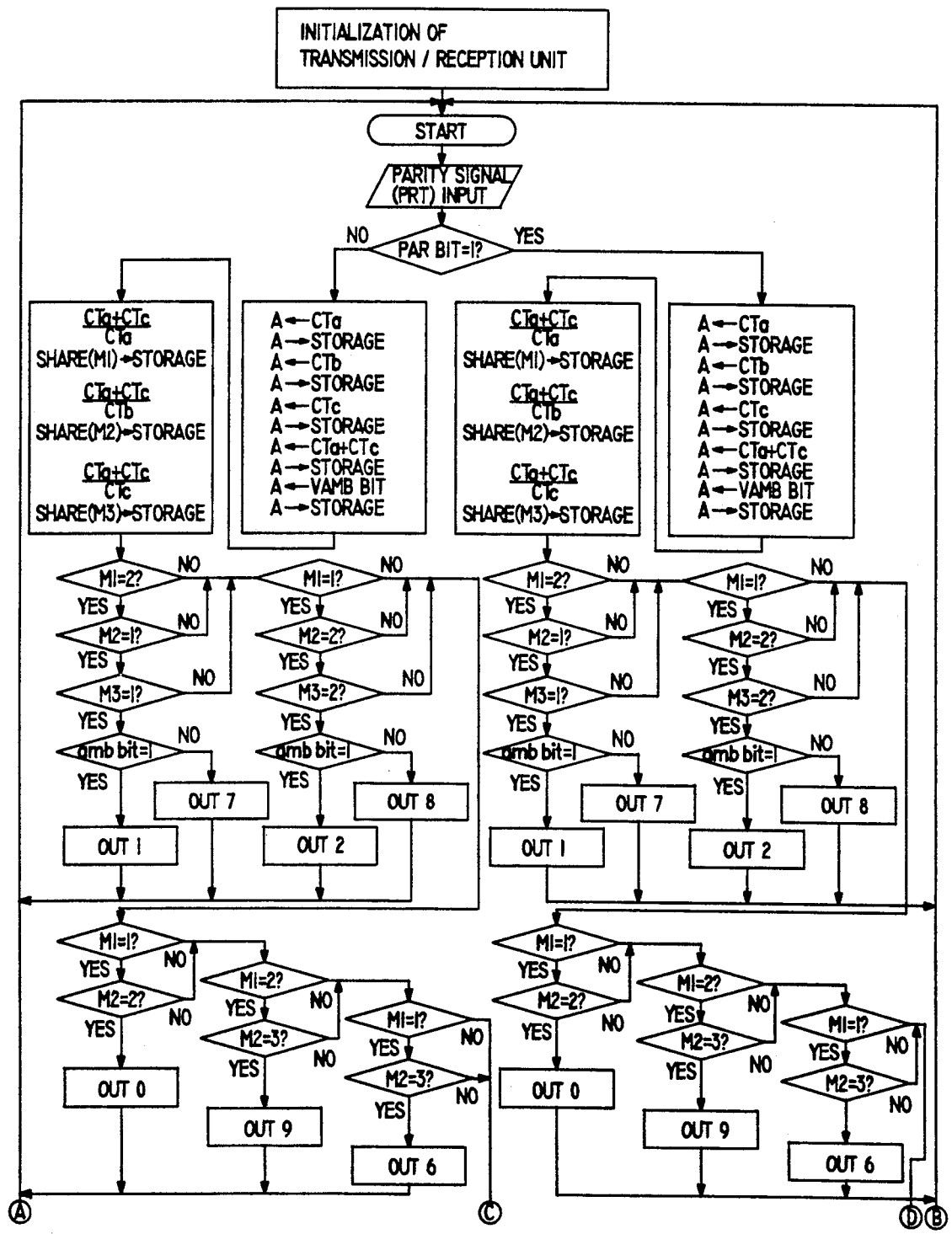
FIG. 9 is a flowchart showing the barcode information recognizing and processing method of the present invention.
Figure 9B:
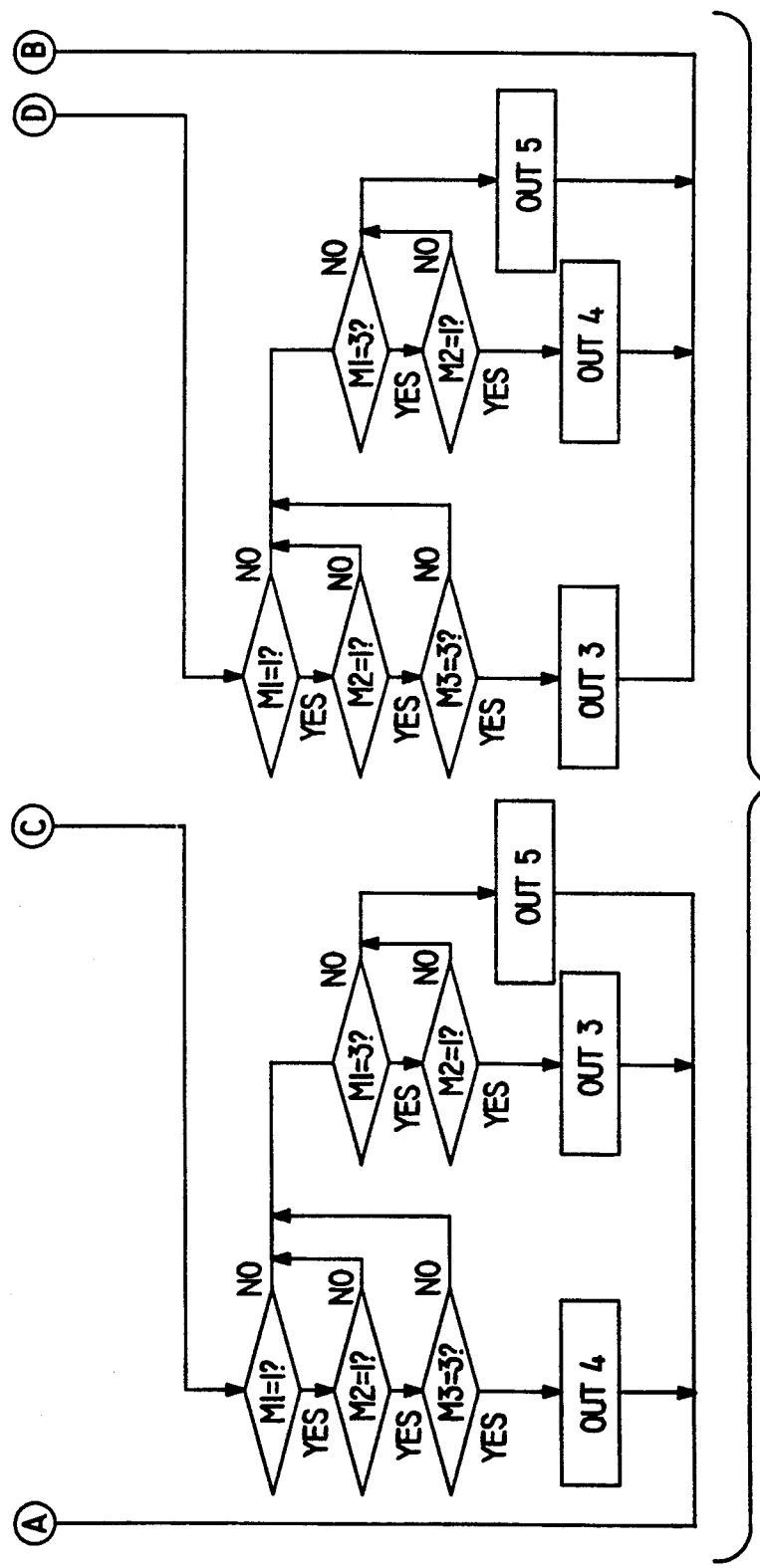

After the scanning is finished with respect to an end guard bar and a proper barcode is detected, the controller 12 applies data stored in the FIFO memory 14 to ports P0-P7 of the microprocessor 15 and thus the procedures as shown in FIG. 9 are carried out. At this moment, the microprocessor 15 checks the parity discrimination signal PRT which is inputted to the ports P0-P7 by being synchronized with the clock pulse of the pulse generator 19 and stores in turn to an accumulator count signals CTa, CTb and CTc of the counter 3, count signals CTa+CTc of the character width comparator 6 indicating the total length of one character, and bits (1, 0) of a similar character discrimination signal VAMB of the similar character discriminator 9, thereafter finds the shares M1, M2 and M3 by dividing the count signal CTa+CTc by count signals CTa, CTb and CTc. That is, the shares M1, M2 and M3 are obtained from the equations $$M1 = \frac{CTa + CTc}{CTa}, M2 = \frac{CTa + CTc}{CTb},$$

$$M3 = \frac{CTa + CTc}{CTc}.$$

Thereafter, in a state of a low potential i.e., in a odd number parity state indicating that the parity discrimination signal PRT has been read from the right, the shares M1=2, M2=M3=1, and when the bit of the similar character discrimination signal VAMB is 1, the character is outputted in a denary data 1, and when the bit of the similar character discrimination signal VAMB is 0, the character is outputted in a denary data 7. And, when the shares M1=1, M2=M3=2 and the bit of the similar character discrimination signal VAMB is 1, the character is outputted in a denary data 2 while the character is outputted in a denary data 8 when the similar character discrimination signal VAMB is 0. Also, when the shares M1=3, M2=2, the character is outputted in a denary data 0 (zero), but since the denary data 0 (zero) is not a similar character, the microprocessor 15 does not check the similar character discrimination signal VAMB. In addition, when the share M1=1, M2=3, the character is outputted in a denary data 6, when M1=M2=1, M3=3, a denary data 4 is outputted, when M1=3, M2=1, a denary data 3 is outputted, and a binary data 5 is outputted in another case.

Meanwhile, in a state of high potential, i.e., in an even number parity state indicating that the parity discrimination signal PRT has been read from the left, when the shares M1=M2=1, M3=2 and the bit of the similar character discrimination signal VAMB is 1, the character is outputted in a denary data 1, and when the bit is 0, the character is outputted in a denary data 7. And, when the shares M1=M2=2, M3=1 and the bit of the similar character discrimination signal VAMB is 1, the character is outputted in a denary data 2 and when the similar character discrimination signal VAMB is 0, the character is outputted in a denary data 8. In addition, when the share M1=1, M2=2, the character is outputted in a denary data 0, M1=1, M2=3, a denary data 9, M1=3, M2=3, a denary data 6, M1=M2=1, M3=3, a denary data 3, M1=3, M2=1, a denary data 4, and in another case, the character is outputted in a denary data 5.

Thus, the microprocessor 15 interprets the barcode data inputted from the FIFO memory 14 as an information carried in the original barcode data, and thereafter selects address terminals A0-A2 and chip selection terminal CSO of the transmitting/receiving unit 16 and then outputs the data in parallel through data input terminals D0-D7. At this moment, the transmitting/receiving unit 16 applies a data terminal stand-by signal DTR and a transmission request signal RTS to the interface 17 through NAND gates NAND1 and NAND2 of the logic circuit 21 and to the host computer 18. As a result, the host computer 18 applies a carrier detect data signal DSD, a data stand-by completion signal DSR and a data signal SIN to the interface 17 so that they are applied to the transmitting/receiving unit 16 through inverters I1, I2 and I3 of the buffer 22. Accordingly, the transmitting/receiving unit 16 applies the barcode data which has been outputted from the microprocessor 15 to the interface 17 through its output terminal Sout via a NAND gate NAND3 of the logic circuit 21 in series, and the interface 17 transmits the inputted data to the host computer 18 in series. Thus, when all the data are transmitted completely, the host computer 18 applies a clear request signal CTS to the interface 17 so that the clear request signal CTS is applied to the transmitting/receiving unit 16 through an inverter gate I3 of the buffer 22, thereby the transmitting/receiving unit 16 outputs a master reset signal MR to reset the microprocessor 15.

In the above, the frequency demultipler 19 is adapted to frequency-demultiply the clock of the clock generator 19 and apply the frequency-demultiplied signal to the transmitting/receiving unit 16 as a synchronous clock signal.

As described above in detail, the present invention has the effects that no error occurs in reading the barcode information and the barcode can be read at a high speed.

What is claimed is:

1. A barcode information recognizing and processing method comprising the steps of:
  storing to an accumulator by a microprocessor (15) a parity discrimination signal (PRT), count signals of one character (CTa, CTb, CTc), a count signal (CTa+CTb) indicating the total length of one character, and a similar character discrimination signal (VAMB) which are outputted in turn from a FIFO (first-in first-out) memory (14) of a barcode reader decoding system;

storing shares (M1)(M2)(M3) obtained by dividing the count signal (CTa+CTc) by the count signals (CTa), (CTb), (CTc), respectively; and transmitting through a transmitting/receiving unit (16) a denary data according to a result obtained by recognizing an original barcode information from said share (M1), (M2), (M3).

2. The method as claimed in claim 1, wherein when the parity discrimination signal (PRT) is an odd parity, share (M1-M3) are M1=2, M2=M3=1 and the similar character discrimination signal (VAMB) is in a high potential or a low potential, a denary data 1 or 7 is outputted, when M1=1, M2=M3=2 and the similar character discrimination signal (VAMB) is in a high potential or a low potential, a denary data 2 or 8 is outputted, when M1=3, M2=2, a denary data 0 is outputted, when M1=2, M2=3, a denary data 9 is outputted, when M1=1, M2=3, a denary data 6 is outputted, when M1=3, M2=1, a denary data 3 is outputted, and in another case, a denary data 5 is outputted and the above data are transmitted through the transmitting/receiving unit (16) and an interface (17) to a host computer (18).

3. The method as claimed in claim 1, wherein when the parity discrimination signal (PRT) is an even parity, shares (M1-M3) are M1=M2=1, M3=2 and the similar character discrimination signal (VAMB) is in a high potential or a low potential, a denary data 1 or 7 is outputted, when M1=M2=2, M3=1 and the similar character discrimination signal (VAMB) is in a high potential or a low potential, a denary data 2 or 8 is outputted, when M1=1, M2=2, a denary data 0 is outputted, when M1=1, M2=3, a denary data 9 is outputted, when M1=3, M2=3, a denary data 6 is outputted, when M1=M2=1, M3=3, a denary data 3 is outputted, when M1=3, M2=1, a denary data 4 is outputted and in another case, a denary data 5 is outputted and the above data are transmitted through the transmitting/receiving unit (16) and the interface (17) to the host computer (18).

* * * * *